Patented Jan. 2, 1951

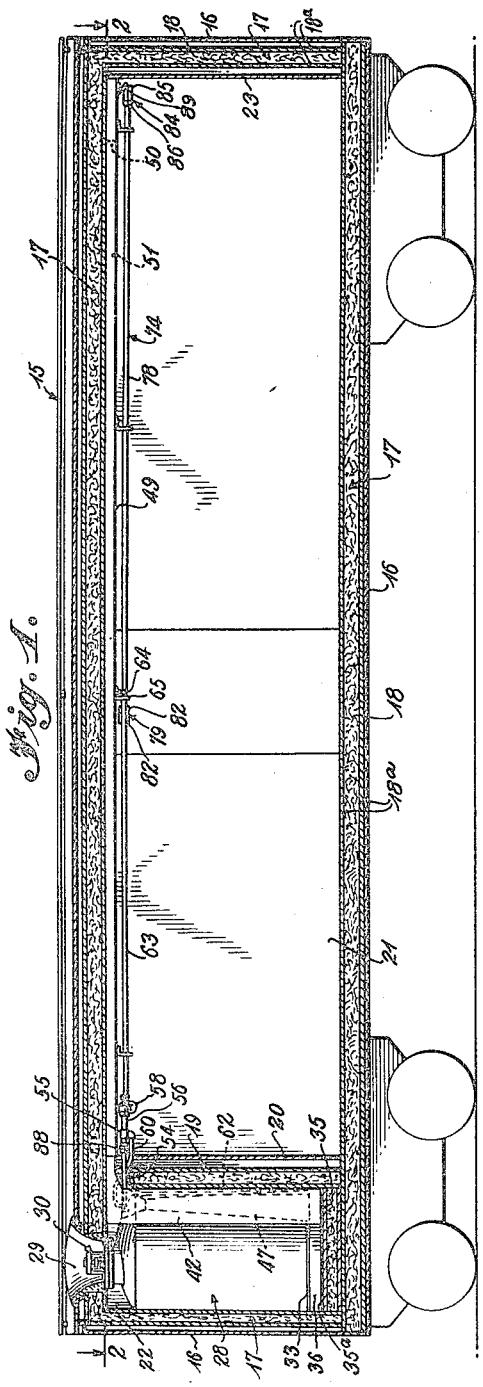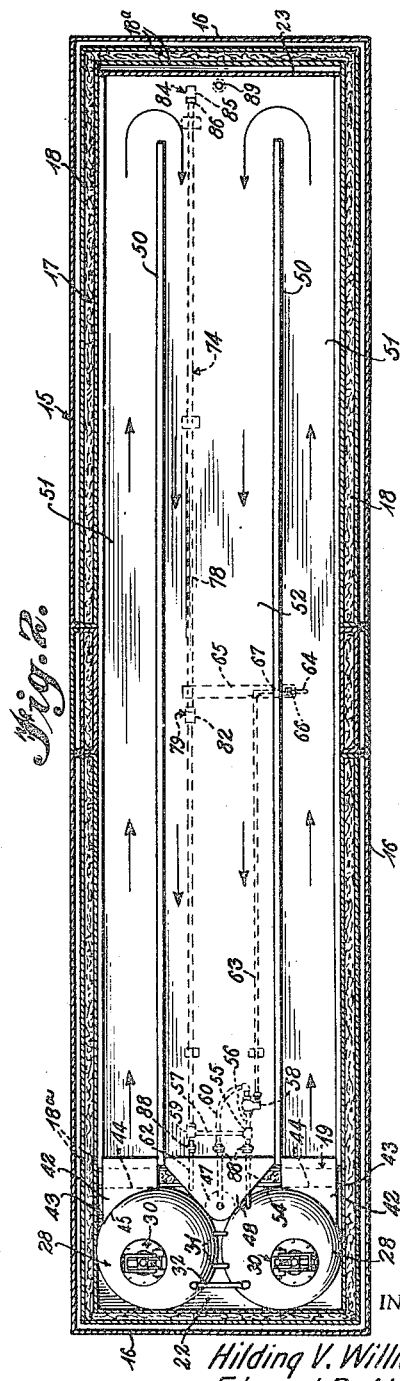

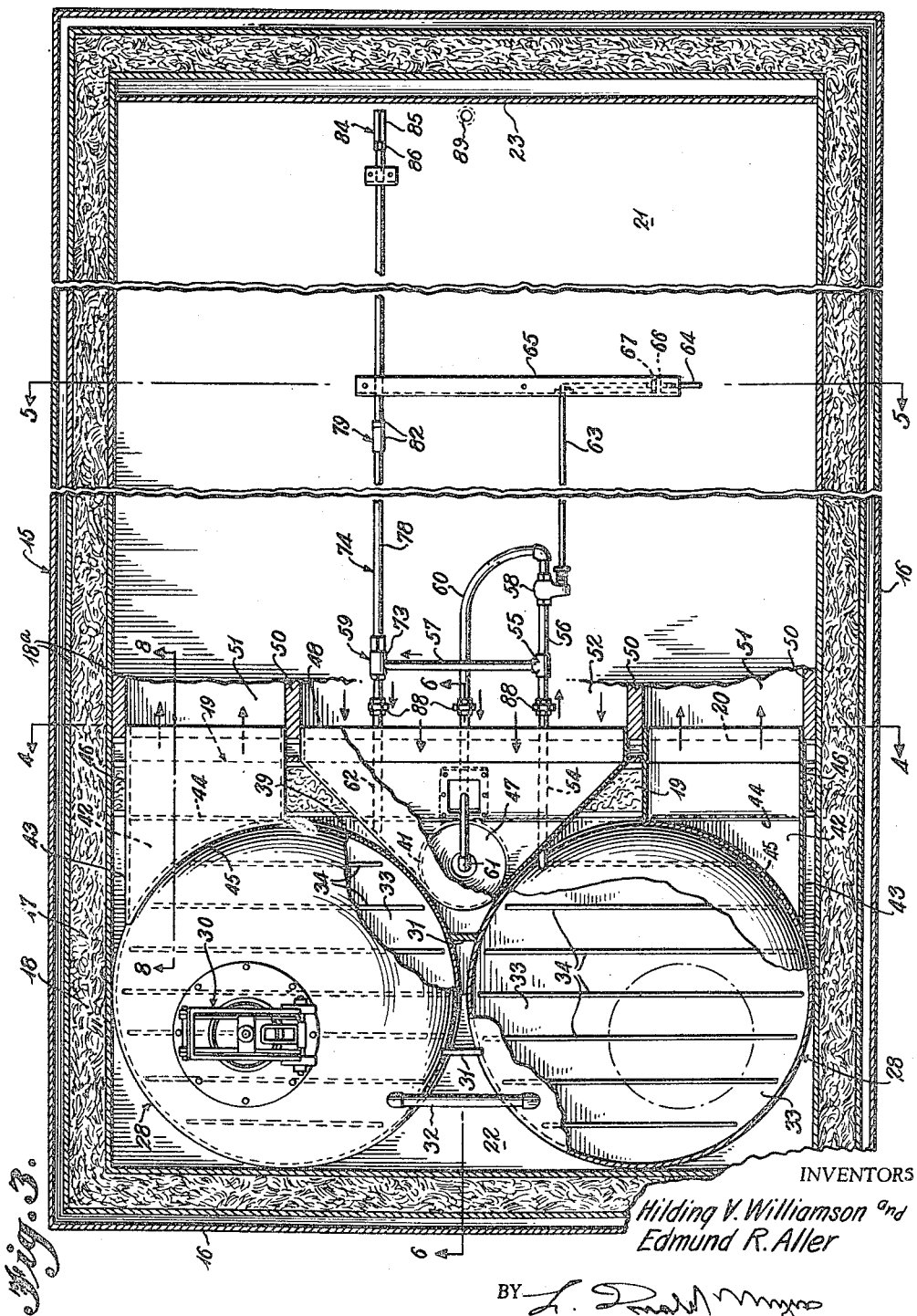

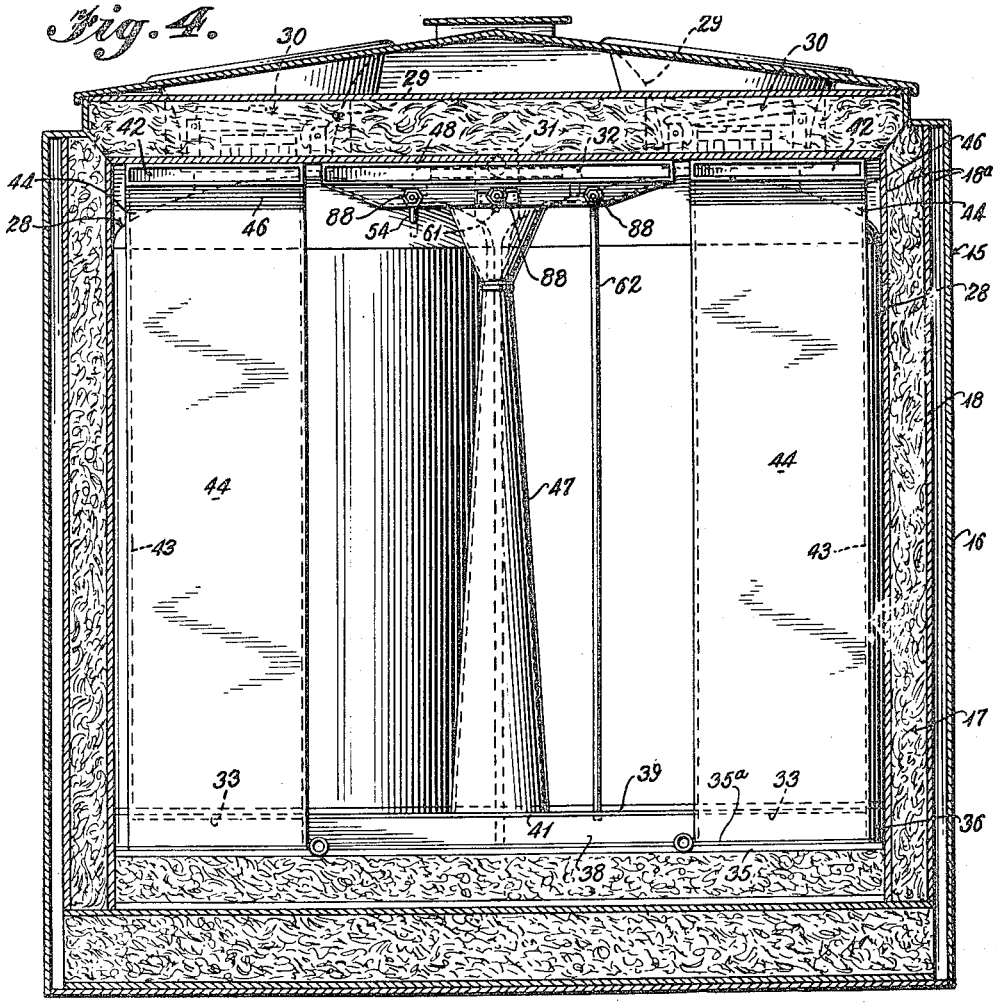
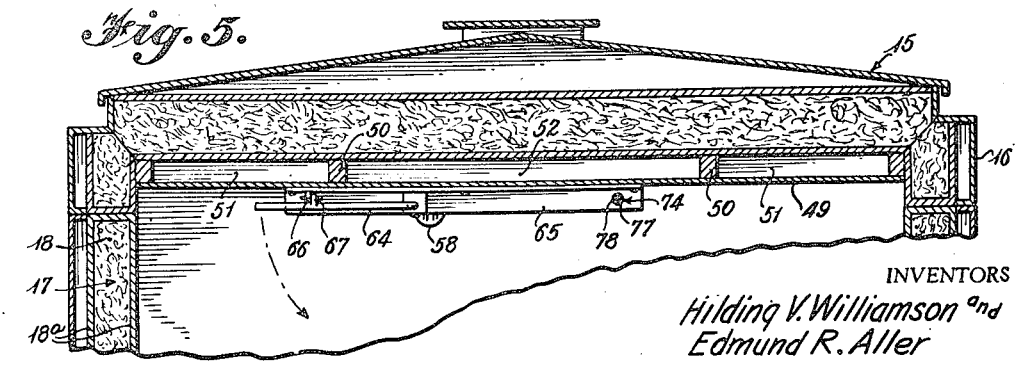

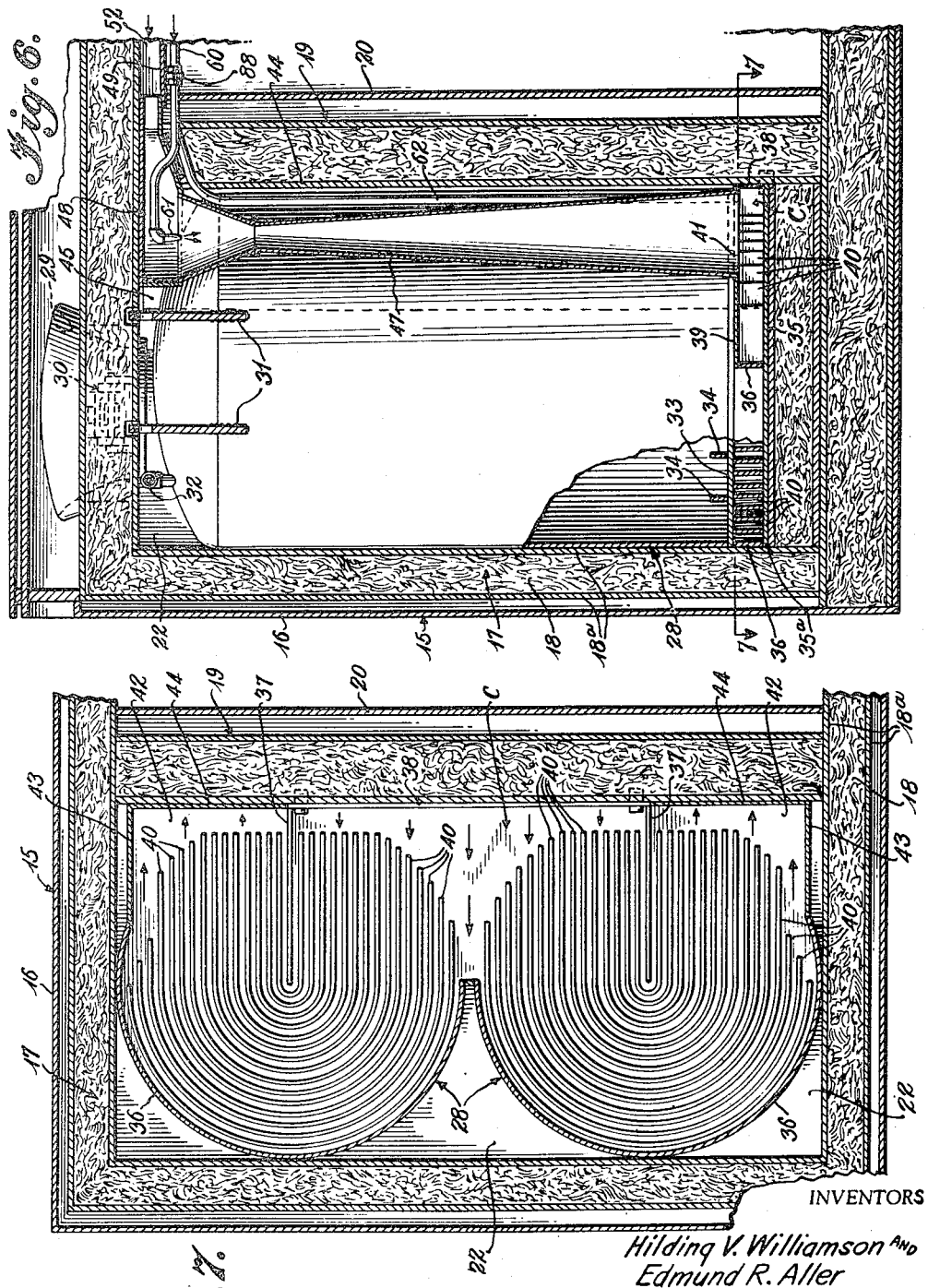

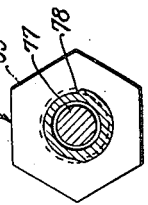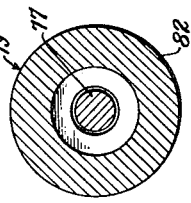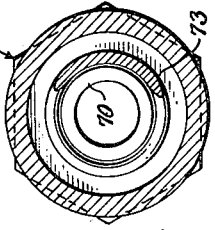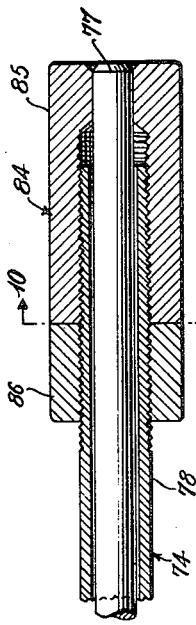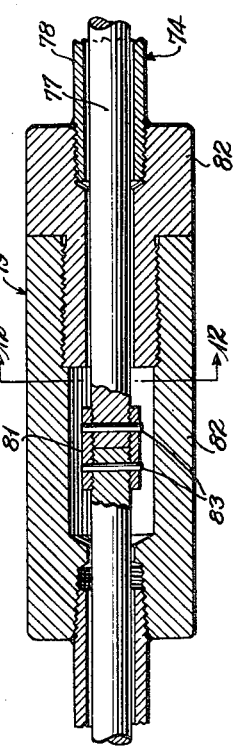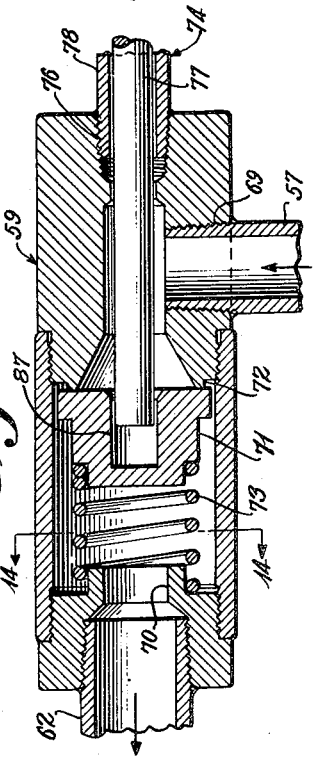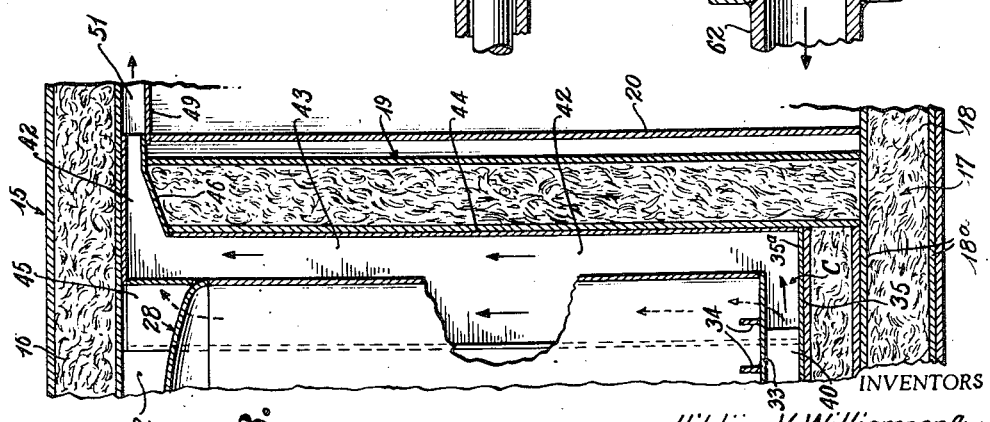

2,536,241

UNITED STATES PATENT OFFICE 2,536,241

REFRIGERATING APPARATUS FOR TRANSPORT VEHICLES AND THE LIKE

Hilding V. Williamson, Chicago, Ill., and Edmund R. Aller, Ogden Dunes, Ind., assignors, by direct and mesne assignments, to Cardox Corporation, Chicago, Ill., a corporation of Illinois Application September 6, 1949, Serial No. 114,124

15 Claims. (Cl. 62—91.5)

1

This invention relates to the refrigeration of railway, water and road transport vehicles, or the like, and more particularly to refrigerating apparatus adapted to employ solid carbon dioxide as a refrigerant.

The use of solid carbon dioxide as a cooling medium for transport vehicles handling frozen foods is becoming increasingly more important because of the several advantages this type of refrigeration has over water ice. Solid carbon dioxide provides a greatly increased refrigerating effect per unit volume of refrigerant as compared to that obtained from water ice. A vehicle refrigerated by means of solid carbon dioxide may be maintained at a lower temperature than is possible by the use of ordinary water ice. Further, solid carbon dioxide will maintain vehicles in a refrigerated condition over a relatively longer period of time without the necessity of replenishing the refrigerant.

When carbon dioxide is used as a refrigerating medium in a transport vehicle it is desirable that the refrigerating effect be utilized as efficiently as possible with a minimum amount of equipment requiring moving parts which might fail during operation of the vehicle. It also is desirable that operation of the refrigerating system be continued independently of movement of the vehicle so that delays en route will not affect operating efficiency. Further, the refrigerating system should be designed to operate independently of any electrical or other auxiliary power source.

It is the primary object of this invention to provide a refrigerating unit for transport vehicles utilizing solid carbon dioxide to effect uniform refrigeration with a minimum of equipment requiring the use of moving parts.

A further object of the invention is to provide a solid carbon dioxide refrigerating unit for transport vehicles that may be readily adjusted to produce and automatically maintain the different temperatures that are required for the successful shipment of different types and kinds of produce.

A still further object of the invention is the utilization of carbon dioxide vapor pressure to circulate the refrigerant and uniformly control the temperature of the interior of a transport vehicle.

Another object of the invention is to provide a refrigerating system for transport vehicles which includes a single, endless space cooling duct system, for the entire interior of the vehicle, through which carbon dioxide vapor is caused to circulate at variable rates in response to the flow stimulating action of a temperature controlled venturi connected in the system and with the circulating carbon dioxide vapor being cooled at two locations by passing in heat exchange relation with solid carbon dioxide confined at said locations.

Still another object of the invention is to provide a carbon dioxide refrigerating unit for transport vehicles in which the major portion of the refrigerant circulating duct system is built into or as a permanent part of the vehicle and the balance of the unit is constructed as a unitary assembly which may be installed and removed without disturbing said built-in or permanent duct structure.

A further object of the invention is to provide a carbon dioxide refrigerating system for transport vehicles which includes a unitary assembly that is formed by two solid carbon dioxide confining receptacles structurally and functionally united at their lower ends by a common chamber which is in direct heat exchange relation thereto, the said chamber having inlet and outlet duct sections attached to the side walls of the receptacles with the inlet duct section taking the form of a venturi that is employed to effect controlled stimulation of the flow of refrigerant through the system.

Other objects and advantages of the invention will be apparent during the course of the following description.

In the accompanying drawings forming a part of this specification and in which like numerals are employed to designate like parts throughout the same, Figure 1 is a side elevational view showing the interior of a railway car equipped with a refrigerating apparatus embodying the invention, Figure 2 is a horizontal sectional view of the car taken on line 2—2 of Fig. 1, and showing the arrangement of the refrigerating apparatus, Figure 3 is an enlarged plan view, partly in section, showing in detail the arrangement of the various portions of the refrigerating apparatus, Figure 4 is a vertical sectional view taken on line 4—4 of Fig. 3, Figure 5 is a fragmentary vertical sectional view taken on line 5—5 of Fig. 3, Figure 6 is a fragmentary vertical sectional view taken on line 6—6 of Fig. 3, Figure 7 is a fragmentary horizontal sectional view taken on line 7—7 of Fig. 6, Figure 8 is a fragmentary vertical sectional view taken on line 8—8 of Fig. 3, Figure 9 is a detail longitudinal sectional view of the adjustable end connection of a temperature control device, Figure 10 is a transverse sectional view taken on line 10—10 of Fig. 9, Figure 11 is a detail longitudinal sectional view of a coupling for the temperature control device, Figure 12 is a transverse sectional view taken on line 12—12 of Fig. 11, Figure 13 is a detail longitudinal sectional view of a vent control valve of the temperature control device, and Figure 14 is a transverse sectional view taken on line 14—14 of Fig. 13.

In the drawings, wherein for the purpose of illustration is shown the preferred embodiment of the invention, and first particularly referring to Figs. 1 and 2, reference character 15 designates a railway car with which the refrigerating apparatus of the invention is employed. It will be appreciated, however, that the refrigerating apparatus may be used with equal advantage in connection with other types of transport vehicles. The outer portions 16 of the bottom, top, sides and ends of the car 15 are of conventional construction. Immediately adjacent these outer portions 16, in the interior of the car 15, is an insulating wall 17 which completely encloses the interior of the car. The insulating wall 17 is formed of a layer of rigid insulating material 18 which lies between and is bonded to the surface sheets of plywood 18a.

One end portion of the interior of the car 15 is separated from the remainder by a bulkhead formed by an insulating wall 19, of a construction similar to the insulating wall 17, and a false end wall 20. The bulkhead serves to separate the shipping compartment 21 from the refrigerating compartment 22 of the car 15. The shipping compartment 21 is further provided with a false wall 23 at its opposite end.

Referring now to the several figures for a detailed description of the refrigerating unit, two pressure sustaining storage receptacles 28 are positioned in the refrigerating compartment 22. Each of the receptacles 28 has a hatchway 29 formed in the roof of the car to facilitate charging the receptacle and a closure device 30 for sealing the charging opening in the receptacle. Each closure device 30 is of the type which is fully described and claimed in the Hilding V. Williamson and James C. Hesson application, Serial No. 16,606, filed March 23, 1948, for Carbon Dioxide Tank Cover for Railway Refrigerator Cars. Reference may be made to this copending application for a complete understanding of this closure and its operating mechanism.

A pair of lugs 31 connect the upper portions of the two receptacles 28 to provide means for lifting the same as a unit and to add rigidity to the assembly. A pipe 32 connects the upper portions of the two receptacles 28 to provide a manifold between their vapor spaces. The bottom wall 33 of each of the receptacles is provided with fins 34 which extend upwardly therein. The fins 34 act to assist thermoconductivity through the bottom of the receptacles 28.

A heat exchange chamber C is formed below the two receptacles 28 and is constructed of the following elements. A plate 35 is positioned beneath and spaced from the bottom walls 33 of the receptacles 28. The edge 35a of the plate 35 conforms in shape with the peripheries of the receptacles 28 and is connected thereto by the curved spacer members 36. A straight partition 37 is mounted between the bottom wall 33 of each of the receptacles 28 and the plate 35 and extends radially from the center of its receptacle toward the bulkhead. The outer end portions of the two straight partitions 37 are attached to a strip 38 which is connected to the edge of the plate 35 and extends upwardly to the level of the bottom walls 33 of the receptacles 28. A triangular plate 39 is connected to and extends between the upper edges of the strip 38 and the spacer members 36 between the two receptacles 28. The portions of the chamber C positioned beneath the receptacles 28 are further divided by the U-shaped partitions 40 into two sets of curved passageways with both sets having their inlets located between the straight partitions 37. The outlets of each set of passageways are located outwardly of their associated straight partition 37.

The triangular member 39 is provided with an opening 41 by which vapor is admitted to the chamber C at the inlets to the curved passageways. The vapor leaving the passageways is directed into the outlet ducts 42 formed by the side walls 43, front walls 44 and portions of the sides of the receptacles 28. The walls 43 and 44 are arranged at right angles to each other and connected along their adjacent vertical edges. The outer vertical edges of the walls 43 and 44 are welded to the receptacles 28 and the bottom edges are connected to the plate 35. As illustrated in Fig. 8, the side walls 43 extend upwardly beyond the tops of the side walls of the receptacles 28 and curved plates 45 are mounted on the receptacles to extend those portions of the walls of the receptacles which form walls of the ducts 42. The front walls 44 terminate below the level of the tops of the side walls 43 and the extension plates 45. A horizontally directed discharge throat 46 is suitably connected to the top edges of the walls 43 and 44 and the plate 45 of each duct 42 for connecting the ducts 42 to a common ceiling duct system to be described in detail at a later point. Vapor is introduced through the aforesaid opening 41 by a vertically arranged Venturi 47 which has an elbow 48 at its upper end portion for connection with the ceiling duct system.

It will be appreciated that the above described refrigerating apparatus is a unitary assembly which is entirely separate and distinct from the railway car which may be installed and replaced as required.

The ceiling duct system is formed by a false ceiling 49 positioned in the car in spaced relation to the top insulating wall 17 and a pair of stringers 50 arranged between the false ceiling 49 and the wall 17. These stringers 49 divide the space between the false ceiling 49 and the wall 17 into two outer longitudinal ducts 51 and a common center duct 52. The stringers 50 terminate in spaced relation to the end of the car 15 so that the outer ducts 51 are in communication with the common center duct 52 at the end of the car opposite the refrigerating compartment 22. The terminal ends of the outer ducts 51 are connected to the discharge throats 46 of the outlet ducts 42 and the terminal end of the central duct 52 is connected to the elbow 48 of the Venturi 47.

Referring to Figs. 3 and 9 through 14 for a detail description of the temperature control mechanism and the effect it has on the circulation of the refrigerating vapor through the system, vapor is withdrawn under its own pressure from the vapor spaces of the manifolded receptacles 28 by the pipe 54. This pipe is connected through a T-coupling 55 and short lengths of pipes 56 and 57 to the gate valve 58 and to the venting valve 59, respectively, to provide alternate or simultaneous flow paths for the vapor delivered by the pipe 54. The vapor flows from the gate valve 58 into the pipe 60 from which it is discharged as a high velocity jet by the nozzle 61 downwardly into the throat of the Venturi 47. Vapor flows through the vent valve 59 to the pipe 62 through which it flows downwardly into the chamber C.

The valve 58 is of the pivoted gate type and is operated by the valve control lever 63, the operating handle 64 of which is located near the central portion of the car 15 so as to be available for operation from its doorway. The operating handle 64 is so constructed that when it is horizontally positioned adjacent the ceiling of the car the valve 58 will be open, and when actuated to extend downwardly the valve 58 will be closed. As illustrated in Fig. 5, the operating handle 64 is supported by the bracket 65 provided with a lug 66 having an opening therethrough which may be alined with an opening in the lug 67 attached to the operating handle. The openings of these lugs 66 and 67 are employed to accommodate a padlock, a seal, or the like, to prevent operation of the handle 64, to close the valve 58, by any unauthorized person.

As illustrated in Figs. 13 and 14, the vent valve 59 is provided with an inlet 69, connected to the pipe 57, and an outlet 70, connected to the pipe 62. A seating disc 71 is provided for contact with the seat 72 to normally prevent the passage of vapor from the inlet 69 to the outlet 70 of the valve. A spring 73 exerts sufficient pressure on the seating disc 71 to maintain the valve closed against pressures below that at which the carbon dioxide vapor is intended to be confined in the receptacle 28. The seating disc 71 may, however, be operated by the temperature control device 74 to vent a portion of the vapor flowing through the pipe 56 into the chamber C through the pipes 57 and 62. One end of the valve 59 is provided with an opening 76 for connection with this temperature control device 74 which consists of an inner metallic rod 77 constructed of any suitable alloy having a very low coefficient of thermal expansion in the lower temperature ranges and an outer pipe 78 of stainless steel, or like material, having a relatively high coefficient of thermal expansion in the lower temperature ranges.

The rod 77 and the pipe 78 are each made up of two sections which are joined at their adjacent ends by the coupling assembly 79. This assembly specifically consists of a collar 81 for threadedly connecting the adjacent ends of the rod 77 and a pair of outer sleeve members 82 threadedly connected to the sections of the pipe 78 and to each other. The collar 81 is provided with lock pins 83 to prevent disassembly of the rod 77 during adjustments of the device.

As illustrated in Figs. 9 and 10, the free end portion of the temperature control device 74 is provided with an adjusting mechanism 84 which consists of an internally threaded collar 85 welded to the outer end portion of the rod 77 and threadedly connected to the outer end portion of the pipe 78 so that rotation of the collar 85 and rod 77 will cause longitudinal adjustment of the rod 77 relative to the pipe 78. A lock nut 86 cooperates with the collar 85 to prevent unintentional changes in the adjustment of the control device 74.

The inner or operating end portion of the pipe 78 is threadedly connected in the opening 76 of the valve 59. The rod 77 extends into the body of the valve 59 and is loosely seated in the depression 87 of the seating disc 71.

It is noted that each of the pipes 54, 60 and 62 is provided with a detachable coupling 88 to allow for disconnecting the unitary refrigerating assembly from the temperature control mechanism during installation or replacement of the assembly.

The mode of operation of the refrigerating apparatus will now be described.

Solid carbon dioxide of any desired chunk or particle size is introduced into the receptacles 28 through the hatchways 29 after which the closure devices 30 are operated to seal the receptacles. After the solid carbon dioxide has been introduced into the receptacle 28, the refrigerating apparatus is set in operation by movement of the operating handle 64 of the valve 58 to its open or horizontal position. The operating handle 64 may then be locked in this position to prevent any tampering with or accidental turning off of the refrigerating apparatus.

With the valve 58 in its open position, carbon dioxide vapor will flow from the receptacles 28 through the pipes 54 and 56, the valve 58 and the pipe 60 for discharge through the nozzle 61 as a high velocity jet into the throat of the Venturi 47. This discharge into the Venturi 47 produces an aspirating effect to stimulate flow of vapor from the duct 52 downwardly through the Venturi 47 and into the chamber C for flow in contact with the bottom wall 33 of the receptacles 28 through the passageways formed by the U-shaped partitions 40. During its passage beneath the receptacles 28 the vapor will be cooled due to the absorption of heat by the solid carbon dioxide in the receptacles. This cooling by indirect heat exchange is assisted by the fins 34.

Upon leaving the outlet ends of the passageways the vapor rises in the ducts 42 on both sides of the car 15 and enters the outer longitudinal ducts 51 in the ceiling of the shipping compartment 21. Upon reaching the end of the car 15 opposite the refrigerating apparatus, the flow of the vapor is reversed for return through the center duct 52. During its flow through the ducts 51 and 52, the carbon dioxide vapor absorbs heat from the shipping compartment 21 and upon leaving the duct 52 the warm carbon dioxide vapor flows downwardly through the Venturi 47 into the compartment C where it is cooled and recirculated, as described above.

As the circulation of the carbon dioxide vapor through the duct system is accomplished by the discharge of the high velocity jet or carbon dioxide vapor into the Venturi 47, this discharge may be reduced or increased in volume to control the rate of heat exchange and consequently the temperature maintained within the shipping compartment 21. Control of the temperature conditions within the compartment 21 is accomplished by the temperature control device 74 and the vent valve 59 in the following manner:

When the temperature within the compartment 21 is sufficiently high to cause the pipe 78 to expand and to withdraw the rod 77 from contact with the seating disc 71, the vent valve 59 will close and all of the carbon dioxide vapor flowing through the pipe 56 will be directed through the pipe 60 and into the Venturi 47 as a high velocity jet. This condition of operation, therefore, will cause the carbon dioxide vapor to pass through the ducts 51 and 52 along the ceiling of the shipping compartment 21 at a relatively high flow rate and will, consequently, cause the temperature in the shipping compartment to be reduced. As the temperature is reduced, the pipe 78 will contract and cause the rod 77 to enter the valve body a sufficient distance for its inner end to contact and unseat the seating disc 71 to open the vent valve 59 an amount that is proportional to the extent of contraction of pipe 78. As this condition occurs, a varied amount of carbon dioxide vapor flowing through the pipe 56 will be diverted to the pipe 57 for flow through the vent valve 59 into the pipe 62. This diverted vapor, therefore, by-passes the Venturi 47 with the result that the vapor circulating function of the Venturi is reduced proportionately. When this condition prevails long enough for the temperature in the shipping compartment 21 to rise, the temperature control device 74 will function to close the vent valve 59 to effect a lowering of the temperature in the compartment 21, as described above.

The temperature maintained within the shipping compartment 21 may be varied as desired by operation of the adjusting mechanism 84. When the collar 85 of this mechanism is moved outwardly of the end of the pipe 78, the inner end of the rod 77 is moved outwardly of the valve 59 a corresponding distance so that a greater reduction of temperature within the shipping compartment is necessary before the lost motion of the rod 77 will be overcome and it will act to open the vent valve 59. By proper adjustment of the mechanism 84 the temperature to be maintained within the compartment 21 may be set at any desired value and will be maintained within a relatilvely narrow range.

If the pressure of the carbon dioxide vapor within the receptacles 28 should for any reason increase beyond a desired storage pressure, which may be established at a figure falling between 10 to 15 pounds per square inch, the spring loaded seating disc 71 of the vent valve 59 will act as a pressure release valve due to the building up of vapor pressure on the seating side of the disc.

As the vapor pressure within the duct system increases, vapor will be vented from the system into the shipping compartment 21 through a vent 89 connected to the duct system so that the duct system will never be subjected to excess pressures. The vent 89 is constructed of rubber tubing with the outlet end portion flattened so as to function as a one-way check valve which will prevent air from entering the duct system while permitting vapor to escape.

In order to facilitate the transfer of heat from the carbon dioxide vapor in the chamber C to the solid carbon dioxide within the receptacles 28, a liquid solvent such as ethylene glycol monoethylene ether or trichlorethylene may be placed in the receptacles. This solvent will form a layer of liquid over the bottom wall 33 of each of the receptacles 28 to prevent the formation of water ice thereon and will provide a liquid heat transfer medium at the relatively low temperatures within the receptacles 28.

It will be noted that the only parts of the refrigerating apparatus which move during operation of the device are the rod 77, the seating disc 71 and the spring 73. These parts, however, move through a very limited distance only and at relatively infrequent intervals. This absence of frequently or rapidly moving parts and the simplicity of design of the refrigerating apparatus contribute greatly to its reliability and to the consistently good results which are obtained from its use.

It is to be understood that the form of the invention herewith shown and described is to be taken as a preferred example of the same, and that various changes in the shape, size and arrangement of parts may be resorted to without departing from the spirit of the invention or the scope of the subjoined claims.

Having thus described the invention, we claim:

1. Apparatus for refrigerating the interior of a transport vehicle, comprising a receptacle for solid carbon dioxide, a chamber in direct heat exchange relation with said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, and means responsive to a temperature change in the vehicle for diverting carbon dioxide vapor from the introducing means for the Venturi into said chamber.

2. Apparatus for refrigerating the interior of a transport vehicle, comprising a receptacle for solid carbon dioxide, a chamber in direct heat exchange relation with said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, means responsive to a temperature change in the vehicle for diverting carbon dioxide vapor from the introducing means for the Venturi into said chamber, and means responsive to an excess vapor pressure in said receptacle for flowing carbon dioxide vapor directly to said chamber.

3. Apparatus for refrigerating the interior of a transport vehicle, comprising a receptacle for solid carbon dioxide, a chamber in direct heat exchange relation with a wall of said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, a valve having its inlet connected to the introducing means for said Venturi and its outlet connected to said chamber, and valve operating means responsive to temperature changes in the vehicle to open and close said valve for intermittently diverting carbon dioxide vapor from said introducing means into said chamber.

4. Apparatus for refrigerating the interior of a transport vehicle, comprising a receptacle for solid carbon dioxide, a chamber in direct heat exchange relation with the bottom wall of said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, a valve having its inlet connected to the introducing means for the Venturi and its outlet connected to said chamber, means for yieldably loading said valve to normally hold it closed but responding to an excessive vapor pressure in said receptacle for permitting the valve to open to vent vapor from the receptacle to the chamber, and valve operating means responsive to temperature changes in the vehicle to open and close said valve for intermittently diverting carbon dioxide vapor from said introducing means into said chamber.

5. Apparatus for refrigerating the interior of a transport vehicle, comprising a receptacle for solid carbon dioxide, a chamber in direct heat exchange relation with said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, means responsive to a temperature change in the vehicle for diverting carbon dioxide vapor from the introducing means for the Venturi into said chamber, a shut-off valve for controlling the flow of carbon dioxide vapor through said introducing means, and means responsive to an increase in the vapor pressure in said receptacle for venting carbon dioxide vapor from said receptacle when said shut-off valve is closed.

6. Apparatus for refrigerating the interior of a transport vehicle, comprising a receptacle for solid carbon dioxide, a chamber in direct heat exchange relation with said receptacle and having an inlet and an outlet, a Venturi having its discharge end portion connected directly to the inlet of said chamber and its inlet end portion located adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle into said Venturi to stimulate the flow of vapor through said chamber and the outlet and refrigerating ducts, a shut-off valve for controlling the flow of carbon dioxide vapor through said introducing means, a venting valve having its inlet connected to said introducing means on the upstream side of said shut-off valve and its outlet connected to said chamber, a seating disc located in said venting valve to open and close the latter, resilient means for yieldably urging said seating disc toward its valve closing position, said disc being movable against the force of said resilient means to open the venting valve when the vapor pressure in said introducing means exceeds a predetermined value, and temperature responsive means operatively associated with said venting valve for unseating said disc to open said venting valve when said temperature responsive means is subjected to temperatures below a predetermined degree.

7. Apparatus for refrigerating the interior of a transport vehicle, comprising a receptacle for solid carbon dioxide, a chamber in direct heat exchange relation with said receptacle and having an inlet and an outlet, a vertically arranged Venturi mounted adjacent the side wall of said receptacle and having its discharge end portion connected directly to the inlet of said chamber and its inlet end portion terminating adjacent the ceiling of the vehicle, an outlet duct connected to the outlet of said chamber and terminating adjacent the ceiling of the vehicle, a refrigerating duct extending along the ceiling of the vehicle and forming a carbon dioxide vapor flow path between the upper end of said outlet duct and the inlet of said Venturi, means for introducing carbon dioxide vapor under pressure from said receptacle downwardly through said Venturi to stimulate the flow of vapor through said chamber and the outlet and refrigerating ducts, and means responsive to a temperature change in the vehicle for diverting carbon dioxide vapor from the introducing means for the Venturi into said chamber.

8. Apparatus for refrigerating the interior of a transport vehicle, comprising a pair of receptacles for solid carbon dioxide, a heat exchange chamber having one of its walls common to the bottom walls of said receptacles and having an inlet located substantially between said receptacles and two outlets located respectively adjacent the outer sides of said receptacles, partitions in said chamber forming two sets of carbon dioxide flow paths with each set extending from the inlet of said chamber to a different one of said outlets, a Venturi having its discharge end portion connected directly to the inlet of said chamber and its inlet end portion located adjacent the ceiling of the vehicle, an outlet duct connected to each one of the outlets of said chamber and terminating adjacent the ceiling of the vehicle, a refrigerating duct system extending along the ceiling of the vehicle and forming carbon dioxide vapor flow paths between the upper ends of said outlet ducts and the inlet of said Venturi, means for introducing carbon dioxide vapor under pressure from said receptacles into said Venturi to stimulate the flow of vapor through said chamber and the outlet ducts and refrigerating duct system, and means responsive to a temperature change in the vehicle for diverting carbon dioxide vapor from the introducing means for the Venturi into said chamber.

9. Apparatus for refrigerating the interior of a transport vehicle, comprising a pair of receptacles for solid carbon dioxide, means connecting the vapor spaces of said receptacles, a heat exchange chamber having one of its walls common to the bottom walls of said receptacles and having a centrally located inlet and a pair of outlets on opposite sides of the chamber, a Venturi having its discharge end portion connected directly to the inlet of said chamber and its inlet end portion located adjacent the ceiling of the vehicle, a pair of outlet ducts connected to the outlets of said chamber and terminating adjacent the ceiling of the vehicle, a refrigerating duct extending along the ceiling of the vehicle and forming carbon dioxide vapor flow paths between the upper ends of said outlet ducts and the inlet to said Venturi, means for introducing carbon dioxide vapor under pressure from said receptacles into said Venturi to stimulate the flow of vapor through said chamber and the outlet and refrigerating ducts, and means responsive to a temperatre change in the vehicle for diverting carbon dioxide vapor from the introducing means for the Venturi into said chamber.

10. Apparatus for refrigerating the interior of a transport vehicle, comprising a pair of receptacles each having a charging opening for solid carbon dioxide, means for sealing said charging openings against the loss of vapor pressure from the receptacles, a pipe connecting the vapor spaces of said receptacles, a chamber having one of its walls in direct heat exchange relation to the bottom walls of said receptacles and having an inlet and two outlets, a Venturi having its discharge end portion connected directly to the inlet of said chamber and its inlet end portion located adjacent the ceiling of the vehicle, a pair of outlet ducts connected to the outlets of said chamber and terminating adjacent the ceiling on opposite sides of the vehicle, a refrigerating duct extending along the ceiling of the vehicle and forming carbon dioxide vapor flow paths between the terminal ends of said outlet ducts and the inlet of said Venturi, means for introducing carbon dioxide vapor under pressure from said receptacles into said Venturi to stimulate the flow of vapor through said chamber and the outlet and refrigerating ducts, and means responsive to a temperature change in the vehicle for diverting carbon dioxide vapor from the introducing means into said chamber.

11. Apparatus for refrigerating the interior of a transport vehicle, comprising a pair of receptacles each having a charging opening for solid carbon dioxide, means for sealing said charging openings against the loss of vapor pressure from the receptacles, a pipe connecting the vapor spaces of said receptacles, a chamber having one of its walls in direct heat exchange relation with the bottoms of said receptacles and having an inlet and two outlets, a plurality of partitions in said chamber forming separate sets of carbon dioxide vapor flow paths between the inlet of said chamber and said outlets, a Venturi having its discharge end portion connected directly to the inlet of said chamber and its inlet end portion located adjacent the ceiling of the vehicle, separate outlet ducts connected to the outlets of said chamber and terminating adjacent the ceiling on opposite sides of the vehicle, a refrigerating duct extending along the ceiling of the vehicle and forming carbon dioxide vapor flow paths between the upper ends of said outlet ducts and the inlet of said Venturi, means for introducing carbon dioxide vapor under pressure from said receptacles into said Venturi to stimulate the flow of vapor through said chamber and the outlet and refrigerating ducts, a valve having its inlet connected to said introducing means for said Venturi and its outlet connected to said chamber, and valve operating means responsive to temperature changes in the vehicle to open and close said valve for intermittently diverting carbon dioxide vapor from said introducing means into said chamber.

12. In apparatus for refrigerating the interior of a transport vehicle, the improvement which comprises a receptacle for solid carbon dioxide, a heat exchange chamber attached to the bottom of said receptacle, said chamber having an inlet and an outlet, a Venturi mounted adjacent the side wall of said receptacle and having its discharge end portion connected directly to the inlet of said chamber and its inlet end portion located adjacent the top of said receptacle, an outlet duct connected to the outlet of said chamber and terminating adjacent the inlet to said Venturi, a carbon dioxide vapor outlet for said receptacle, means for introducing carbon dioxide vapor from the receptacle outlet into said Venturi, and means for venting carbon dioxide vapor from the said introducing means directly to said chamber.

13. In apparatus for refrigerating the interior of a transport vehicle, the improvement which comprises a receptacle for solid carbon dioxide, a heat exchange chamber attached to the bottom of said receptacle, said chamber having a single inlet and a pair of outlets, a plurality of partitions in said chamber forming carbon dioxide vapor flow paths between said inlet and each of said outlets, a Venturi mounted adjacent the side wall of said receptacle and having its discharge end portion connected directly to said chamber inlet and its inlet end portion located adjacent the top of said receptacle, a pair of outlet ducts connected to the outlets of said chamber and having their upper end portions terminating adjacent to and on opposite sides of the inlet of said Venturi, a carbon dioxide vapor outlet at the top of said receptacle, means for introducing carbon dioxide vapor from said receptacle outlet into said Venturi, and a pipe for venting carbon dioxide vapor from said vapor outlet into said chamber.

14. In apparatus for refrigerating the interior of a transport vehicle, the improvement which comprises a pair of receptacles for solid carbon dioxide having their vapor spaces connected, means rigidly connecting the upper portions of said receptacles, a heat exchange chamber connecting the bottoms of said receptacles and having its top wall common to the bottom walls of said receptacles, said chamber having a centrally located inlet and a pair of outlets, a Venturi mounted between adjacent sides of said receptacles and having its discharge end portion connected directly to said chamber inlet and its inlet end portion located adjacent the tops of said receptacles, a pair of outlet ducts attached to the sides of said receptacles and connected to the outlets of said chamber, the upper end portions of said outlet ducts being on opposite sides of the inlet of said Venturi, and means for introducing carbon dioxide vapor from said receptacles into said Venturi.

15. In apparatus for refrigerating the interior of a transport vehicle, the improvement which comprises a pair of receptacles for solid carbon dioxide having their vapor spaces connected, means rigidly connecting the upper portions of said receptacles, a heat exchange chamber rigidly connecting the bottoms of said receptacles and having its top wall common to the bottom walls of said receptacles, said chamber having a centrally located inlet and a pair of outlets, a plurality of partitions in said chamber forming carbon dioxide vapor flow paths between said inlet and each of said outlets, a Venturi mounted between adjacent sides of said receptacles and having its discharge end portion connected directly to said chamber inlet and its inlet end portion located adjacent the tops of said receptacles, a pair of outlet ducts attached to the sides of said receptacles and connected to the outlets of said chamber, the upper end portions of said outlet ducts being on opposie sides of the inlet of said Venturi, and means for introducing carbon dioxide vapor from said receptacles into said Venturi.

HILDING V. WILLIAMSON.
EDMUND R. ALLER.

REFERENCES CITED

The following references are of record in the file of this patent:

UNITED STATES PATENTS

| Number | Name | Date |
| --- | --- | --- |
| 1,796,907 | Josephson | Mar. 17, 1931 |
| 1,917,873 | Campbell | July 11, 1933 |
| 1,925,537 | Killeffer | Sept. 5, 1933 |
| 1,926,700 | Owens | Sept. 12, 1933 |
| 1,949,518 | Vold | Mar. 6, 1934 |
| 1,965,205 | Smith | July 3, 1934 |
| 2,190,796 | Michalske | Feb. 20, 1940 |
| 2,298,879 | Elsey | Oct. 13, 1942 |
| 2,502,192 | Williamson | Mar. 28, 1950 |